March 22, 1960   M. S. MAURER   2,929,990
VOLTAGE RATIO AND PHASE ANGLE TESTER
Filed Oct. 28, 1957

INVENTOR,
MARTIN S. MAURER
BY
Harry M. Saragovitz
ATTORNEY.

United States Patent Office 2,929,990
Patented Mar. 22, 1960

2,929,990

VOLTAGE RATIO AND PHASE ANGLE TESTER

Martin S. Maurer, Clifton, N.J., assignor to the United States of America as represented by the Secretary of the Army Application October 28, 1957, Serial No. 692,986

5 Claims. (Cl. 324—57)

(Granted under Title 35, U.S. Code (1952), sec. 266)

The invention described herein may be manufactured and used by or for the Government for governmental purposes, without the payment of any royalty thereon.

The present invention relates to electrical testers and more specifically to testers for four terminal electrical devices where the ratio of input to output voltage and the phase angle therebetween are to be determined.

An object of the present invention is to provide an electrical test device capable of measuring voltage ratios and phase angles of a variety of electrical devices.

A further object of the present invention is to provide apparatus capable of testing a variety of electrical apparatus to determine their characteristics either on alternating or direct current.

A still further object of the invention is to provide test appartus of the type described which is simple, inexpensive and which can be readily assembled from standard and readily available components.

Figure 1:
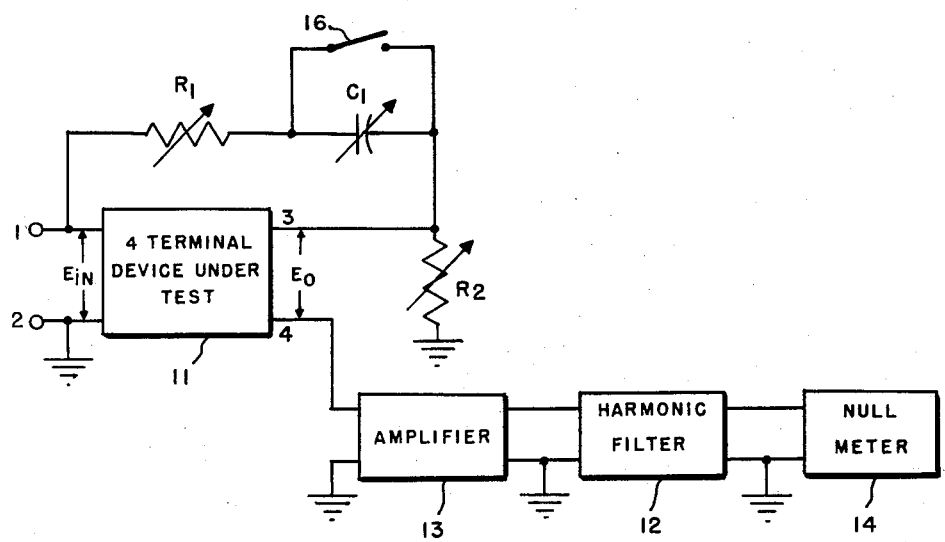
Figure 2:
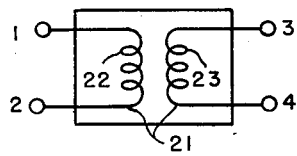
Figure 3:
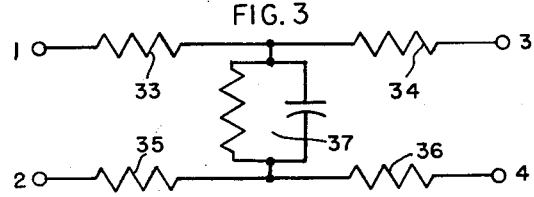
Figure 4:
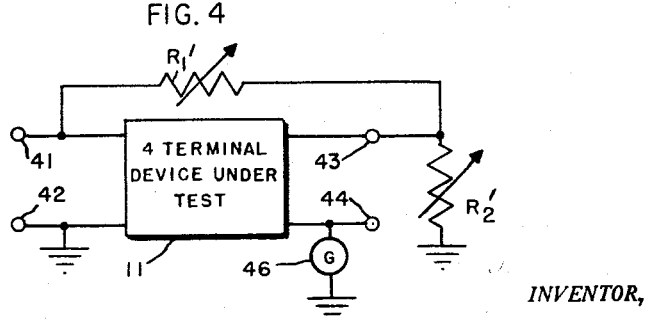

Other objects and many attendant advantages of the invention will become apparent as the same becomes better understood from the following detailed description when taken in connection with the annexed drawing wherein:

Fig. 1 is a schematic drawing of a preferred embodiment of the invention adapted to test the performance of four terminal devices having alternating current applied thereto, Figs. 2 and 3 are schematic representatives of typical four terminal devices whose performance characteristics may be tested by the invention, and Fig. 4 is a further embodiment of the invention which is adapted to measure the characteristics of a four terminal device having direct current applied thereto.

There exists in the electrical arts a large family of devices which are classed as "four terminal devices." These devices considered from a circuit standpoint have many features in common though they may have no internal similarity. In general they may be said to modify or produce a change between a voltage applied to their input terminals as compared to the voltage developed at their output terminals. This change may exist in a change in magnitude between the respective voltages, or if alternating current is employed, in a shift in phase angle and/or the relative magnitudes of the voltages. The devices may take various forms such as transformers, rotary transformers such as selsyns, filter circuits, attenuator networks or the like. The restriction of the family of devices so far as the present invention is concerned is that the input and output circuits of the device cannot have a terminal in common or at the same potential. Typical examples of four terminal devices are set forth in Figs. 2 and 3 though it is to be specifically understood that the invention is not limited to the testing of the specific devices illustrated.

Fig. 2 illustrates a transformer 21 having a primary winding 22 connected across input terminals 1 and 2 and a secondary winding 23 connected across output terminals 3 and 4.

Fig. 3 illustrates a second four terminal device in the form of an impedance network having a first pair of series impedances 33 and 34 connected between input terminal 1 and output terminal 3. A second pair of series impedances 35 and 36 are connected between input terminal 2 and output terminal 4. A shunt impedance arm 37 shown as a resistance shunted by a capacitor is connected between the midpoints or junctions of the two series arms. While resistive and capacitive components have been illustrated any form of impedance unit may be used and connected in any circuit configuration so long as there is no direct connection between input and output terminals.

Fig. 1 illustrates the invention as applied to the testing of a four terminal device for alternating circuit conditions. A four terminal device 11, which is under test, has an alternating input voltage $E_{in}$ applied across input terminals 1 and 2 and output voltage $E_o$ derived across output terminals 3 and 4. Between the input terminal 1 and the output terminal 3 are connected variable resistor $R_1$ and variable capacitor $C_1$ in series. Switch 16, across capacitor $C_1$ is open under these conditions. A variable resistor $R_2$ is connected between output terminal 3 and ground. The input circuit of an amplifier 13 is connected between output terminal 4 and ground.

A harmonic filter 12 is connected between amplifier 13 and null meter 14. Both amplifier 13 and harmonic or low-pass filter 12 have one input and one output terminal grounded along with a terminal of null meter 14. Harmonic filter 12 is used to remove any harmonics that may be developed by the device under test, so that a more accurate reading can be obtained on null meter 14. The null meter may be any sensitive alternating current meter such as those commonly applied to A.-C. bridge circuits.

When an alternating input voltage $E_{in}$ is applied across the input terminals 1 and 2, and $R_1$, $R_2$, and $C_1$ adjusted until null meter 14 reads zero, the following voltage magnitude ratio exists in the system.

$$\frac{E_o}{E_{in}} = \frac{R_2}{\sqrt{(R_1+R_2)^2+\left(\frac{1}{\omega C_1}\right)^2}}$$

where the angular frequency $\omega$ equals $2\pi$ times the frequency of the input voltage.

The phase angle $\theta$ between the input and output voltages is:

$$\theta = /\tan^{-1}\frac{1}{\omega(R_1+R_2)C_1}$$

The apparatus illustrated in Fig. 4 may be applied to the testing of four terminal devices for direct current application. It will be noted that the device 11 to be tested is connected as before but with a direct current input voltage applied to input terminals 41 and 42. The variable resistance $R_1'$ is now connected directly between input terminal 41 and output terminal 43, the condenser $C_1$ being omitted from the circuit. Variable resistor $R_2'$ is connected from output terminal 43 to ground and output terminal 44 is connected to ground through a galvanometer 46 which serves as the null meter for the direct current test. Resistors $R_1'$ and $R_2'$ are adjusted to obtain a balance or null condition as before. When this has been done the same balance equation applies but the $\omega$ term being zero the voltage ratio becomes:

$$\frac{E_o}{E_{in}} = \frac{R_2}{R_1+R_2}$$

There is, of course, no phase angle between the voltages for the direct current case.

The same balancing apparatus may be used for both alternating and direct current tests by connecting a shorting switch 16 in parallel with the condenser $C_1$ as shown in Fig. 1. The switch may be opened for alternating current tests and closed for direct current tests. The null detector is of course chosen to be used with the nature of the supply source.

The foregoing disclosure relates to only the preferred embodiments of the invention, and numerous modifications or alterations may be made therein without departing from the spirit and scope of the invention as set forth in the appended claims.

What is claimed is:

1. An electrical network for testing the ratio of voltages of a four terminal electrical device having no terminals in common and having input and output circuits, said network comprising means to connect a source of power directly to the input circuit of said device, first and second variable impedance means connected in series across said source, a null detecting means connected directly between a terminal of the output circuit and a terminal of the input circuit, the other terminal of said output circuit being connected directly to the junction of said first and second variable impedance means.

2. In a measuring instrument for testing a four terminal device having no terminals in common, said device having a pair of input and a pair of output terminals: a network comprising first and second variable impedances and a null meter, said null meter having a pair of terminals, said first impedance being electrically connected between a first of said pair of input terminals and a first of said pair of output terminals, said second impedance being electrically connected between said first output terminal and one terminal of said null meter, said one terminal of said null meter being connected to the second of said pair of input terminals, the other terminal of said null meter being electrically connected to the second of said pair of output terminals, whereby when a voltage is applied across said pair of input terminals and said impedances are adjusted until a null reading is obtained on said null meter, the ratio of the output to the input voltage may be determined from the values of said impedances.

3. An electrical network for determining the ratio of the output voltage $E_o$ to the input voltage $E_{in}$ and the phase angle $\theta$ therebetween of a four terminal device having no terminals in common, said device having a pair of input and a pair of output terminals, said network comprising first and second calibrated variable resistors $R_1$ and $R_2$, a calibrated variable capacitor $C_1$, and a null meter, said first resistor and said capacitor being electrically connected in series between a first of said pair of input terminals and a first of said pair of output terminals, said second resistor being electrically connected from said first output terminal to ground, said null meter being electrically connected between a second of said pair of output terminals and ground, said device having a second of said pair of input terminals electrically at ground, whereby when an input voltage having an angular frequency $\omega$ is applied across said pair of input terminals and said resistors and said capacitor are adjusted so that said null meter reads zero, the voltage ratio is given by the following equation:

$$\frac{E_o}{E_{in}} = \frac{R_2}{\sqrt{(R_1+R_2)^2+\left(\frac{1}{\omega C_1}\right)^2}}$$

and the phase angle $\theta$ between the input and output voltage is given by the following equation:

$$\theta = /\tan^{-1}\frac{1}{\omega(R_1+R_2)C_1}$$

4. The electrical network of claim 3 further comprising a switch connected in parallel with said capacitor, whereby the closing of said switch will allow for testing direct current voltage ratios and the opening of said switch will allow for testing alternating current voltage ratios.

5. An electrical network for determining the voltage ratio of an output voltage $E_o$ and an input voltage $E_{in}$ of a four terminal device having no terminals in common, said device having a pair of input and a pair of output terminals, said network comprising first and second variable calibrated resistors $R_1$ and $R_2$, and a variable calibrated capacitor $C_1$, said first resistor and said capacitor being electrically connected in series between a first of said pair of input terminals and a first of said pair of output terminals, said second resistor being electrically connected from a first of said output terminals to ground, a second of said pair of input terminals, being connected to ground, an amplifier having an input connected to the second of said pair of output terminals of said device, a null meter, and a harmonic filter connected between the output of said amplifier and the input of said null meter, said amplifier and said harmonic filter each having an input and output terminal electrically grounded, said null meter having an input terminal grounded, whereby when an input voltage having an angular frequency $\omega$ is applied across said first and second input terminals and said resistors and said capacitor are adjusted so that said null meter gives a null indication, the voltage ratio is given by the following equation:

$$\frac{E_o}{E_{in}} = \frac{R_2}{\sqrt{(R_1+R_2)^2+\left(\frac{1}{\omega C_1}\right)^2}}$$

References Cited in the file of this patent

UNITED STATES PATENTS

| | | |
|---|---|---|
| 1,684,397 | Hubbard | Sept. 18, 1928 |
| 1,841,088 | Christopher | Jan. 12, 1932 |
| 1,847,127 | Mayer | Mar. 1, 1932 |
| 2,294,941 | Tuttle | Sept. 8, 1942 |
| 2,309,490 | Young | June 26, 1943 |
| 2,657,352 | Sink | Oct. 27, 1953 |
| 2,677,101 | Brune | Apr. 27, 1954 |
| 2,682,636 | Brewer | June 29, 1954 |
| 2,749,511 | Canning | June 5, 1956 |